(12) United States Patent
Ishigaki et al.

(10) Patent No.: US 6,962,680 B1
(45) Date of Patent: Nov. 8, 2005

(54) METHOD AND APPARATUS FOR REMOVING SULFUR COMPOUND IN GAS CONTAINING HYDROGEN SULFIDE, MERCAPTANS, CARBON DIOXIDE AND AROMATIC HYDROCARBON

(75) Inventors: Shinya Ishigaki, Higashiibaraki-gun (JP); Mitsuru Kida, Yokohama (JP); Takashi Sasaki, Yokohama (JP)

(73) Assignee: JGC Corporation, Tokyo (JP)

( * ) Notice: Subject to any disclaimer, the term of this patent is extended or adjusted under 35 U.S.C. 154(b) by 0 days.

(21) Appl. No.: 10/399,382

(22) PCT Filed: Oct. 18, 2000

(86) PCT No.: PCT/JP00/07212

§ 371 (c)(1),
(2), (4) Date: Apr. 16, 2003

(87) PCT Pub. No.: WO02/32810

PCT Pub. Date: Apr. 25, 2002

(51) Int. Cl.⁷ .............................. B01J 8/00; C01B 7/00; C01B 17/02
(52) U.S. Cl. ............................... 423/244.09; 423/574.1
(58) Field of Search .............................. 423/220, 224, 423/230, 224.02, 437.1, 563, 564, 565, 573.1, 423/574.1, 575, 576.2, 594.3, 594.5, 600, 423/594.13, 244.07

(56) References Cited

U.S. PATENT DOCUMENTS

| | | | |
|---|---|---|---|
| 3,963,443 A * | 6/1976 | Bond et al. | 422/189 |
| 4,293,525 A | 10/1981 | Reitzenstein | |
| 4,363,790 A | 12/1982 | Anderson et al. | |
| 4,382,010 A | 5/1983 | Lurie | |
| 4,430,317 A * | 2/1984 | Reed et al. | 423/574.1 |
| 5,176,896 A * | 1/1993 | Bela | 423/574.1 |

FOREIGN PATENT DOCUMENTS

| | | |
|---|---|---|
| GB | 1558656 | 1/1980 |
| JP | 53-77873 | 7/1978 |
| JP | 57-135702 | 8/1982 |
| JP | 58-11247 | * 1/1983 |
| JP | 60-258294 | 12/1985 |
| JP | 4-317742 | * 11/1992 |
| JP | 8-290904 | 11/1996 |
| JP | 9-255974 | 9/1997 |
| JP | 10-028837 | 2/1998 |

OTHER PUBLICATIONS

Machine Translation of JP 08-290904 (corresponding original foreign document cited on PTO-1449).*
Machine Translation of JP 09-255974 (corresponding original foreign document cited on PTO-1449).*
Machine Translation of JP 10-028837 (corresponding original foreign document cited on PTO-1449).*

* cited by examiner

*Primary Examiner*—Colleen P. Cooke
(74) *Attorney, Agent, or Firm*—Darby & Darby (57) ABSTRACT

A method for removing sulfur compounds including transferring the impurity gas to a concentration process in which the impurity gas is separated into a concentrated gas containing hydrogen sulfide and a residual gas containing carbon dioxide, mercaptans and aromatic hydrocarbons: transferring the concentrated gas to a Claus reaction process in which hydrogen sulfide is recovered as an elementary sulfur, and an off-gas discharged from the Claus reaction process is heated to a temperature between the discharge temperature and 700° C.; introducing the heated off-gas into a mixing unit provided downstream of the heating means to be mixed with the residual gas; transferring a resultant mixed gas to a hydrogenation reaction process in which sulfur compounds are converted into hydrogen sulfide under the presence of a reduction catalyst; and separating the converted hydrogen sulfide and returning the separated hydrogen sulfide to the Claus reaction process.

8 Claims, 5 Drawing Sheets

METHOD AND APPARATUS FOR REMOVING SULFUR COMPOUND IN GAS CONTAINING HYDROGEN SULFIDE, MERCAPTANS, CARBON DIOXIDE AND AROMATIC HYDROCARBON

TECHNICAL FIELD

The present invention relates to a method and apparatus for removing sulfur compounds, such as hydrogen sulfide ($H_2S$), mercaptans, and organic sulfur compounds, contained in a natural gas, an associated gas, a synthesis gas, a processing plant gas, a coal gasified gas, or a heavy oil gasified gas (hereinafter abbreviated as "natural gas, etc.," in the present invention).

BACKGROUND ART

Carbon dioxide ($CO_2$), $H_2S$, COS, mercaptans, and aromatic hydrocarbons, are examples of impurity gases contained in natural gas, etc., and these impurity contents tend to gradually increase in recent years in association with decreasing of quality of natural gas, etc., obtained from gas wells. Accordingly, it is necessary to purify the natural gas, etc., by removing the impurity gases therefrom in order to produce a product gas.

As a method for removing $H_2S$ contained in an impurity gas (acid gas), on the other hand, one which utilizes a Claus reaction is available. In the Claus reaction, a part of $H_2S$ in a gas is oxidized to be $SO_2$, and the $SO_2$ obtained is reacted with residual $H_2S$ to react and recover elementary sulfur substances, thereby removing $H_2S$ in the gas.

Also, a method is known in which the rate of removing sulfur components is increased by hydrogenating residual $SO_2$, which is contained in an off-gas after the Claus reaction, to be $H_2S$ in the presence of catalyst, and returning the obtained $H_2S$ to a Claus reaction apparatus.

As mentioned above, various components other than $H_2S$ are contained as impurity components accompanied with a natural gas, etc., and the following problems may occur when such impurity gases are separated from the natural gas, etc., and are introduced into a Claus reaction apparatus in order to remove sulfur components contained therein:

1. the rate of removing the sulfur components is decreased since a large amount of components other than $H_2S$, for instance $CO_2$, is contained in an impurity gas (acid gas), which reduces the concentration of $H_2S$ and decreases the reaction rate in the Claus reaction; and
2. aromatic hydrocarbons (benzene, toluene, xylene, etc., (BTX)) contained in an impurity gas (acid gas) are incompletely combusted and soot is generated, and hence the sulfur recovered may be contaminated by the soot, thereby decreasing the quality of the sulfur, and also the Claus catalyst layer may be clogged by the soot.

As a method for subjecting a hydrogen sulfide containing gas including a large amount of $CO_2$, for example, one which is disclosed in Japanese Examined Patent Application, Second Publication No. Sho 63-17488 is conventionally known.

In this method, a part of $H_2S$ containing gas including 20 vol. % or more of $CO_2$ is supplied to a Claus plant, and the rest of the gas is made to contact with an absorbent which selectively absorbs $H_2S$, and $H_2S$ which is regenerated and separated from the absorbent is returned to the Claus plant.

However, using this method, it is not possible to sufficiently solve the above-mentioned problems.

As a method for solving the problem, one is disclosed in Japanese Unexamined Patent Application, First Publication No. Hei 10-28837.

Figure 1:
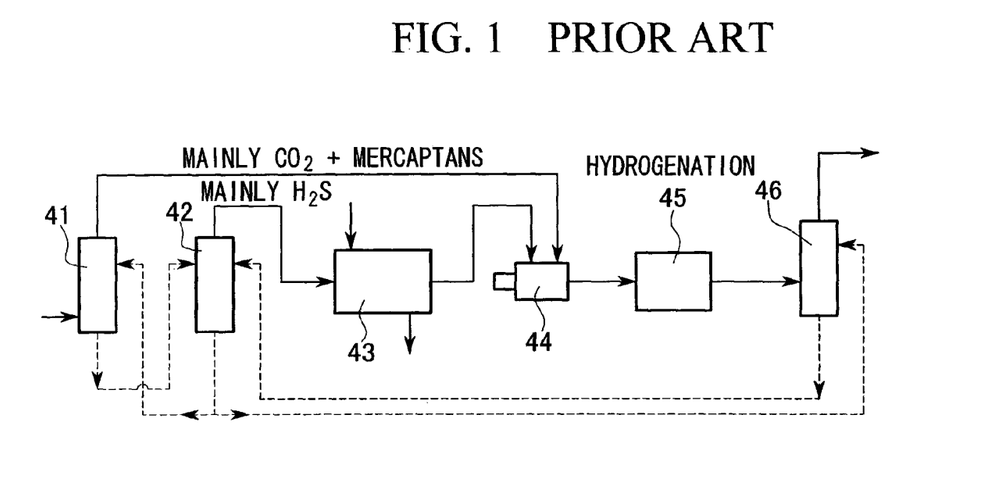
FIG. 1 is a diagram showing a schematic structure of a conventional sulfur removing device.

In this method, as shown in FIG. 1, a residual impurity gas (acid gas) containing $CO_2$, $H_2S$, mercaptans, and BTX, etc., which is obtained after purifying a product natural gas from a raw natural gas, is separated to a concentrated gas including $H_2S$ as a main gas and to a residual gas including $CO_2$ as a main gas, mercaptans, and BTX, in an absorption tower 41 and a regeneration tower 42.

Then, the concentrated gas is transferred to a Claus sulfur recovering device 43, and a majority of $H_2S$ is recovered as elementary sulfur in the device 43. An off-gas (exhaust gas) from the Claus sulfur recovering device 43 is transferred to a heating furnace 44 together with the above-mentioned residual gas to be heated, and then the heated gas is transferred to a hydrogenation reactor 45. In the hydrogenation reactor 45, sulfur compounds, such as $SO_2$, mercaptans, and sulfur vapor, contained in the heated gas is reduced to $H_2S$ in the presence of a reduction catalyst.

The obtained $H_2S$ is separated in an absorption tower 46, and this is returned to the Claus sulfur recovering device 43 via the regeneration tower 42.

This method of prior application has advantages such as a high removing rate of sulfur from sulfur compounds contained in an impurity gas (acid gas), prevention of clogging in a catalyst layer of the Claus sulfur recovering device 43, and high quality of recovered elementary.

However, it was found that even this method has the following elements that should be improved.

That is, since the residual gas and the off-gas are introduced into the above-mentioned heating furnace 44 at the same time and heated, soot may be generated due to BTX contained in the residual gas, and the generated soot may flow into the hydrogenation reactor 45 used in the next step so as to deactivate the reduction catalyst or clog the catalyst layer.

The cause of the problem is found to be direct contact of the residual gas with the flame of a combustion burner of the heating furnace 44, and the temperature at that time is 700° C. or higher. Accordingly, the problem may be solved if the residual gas does not make direct contact with the flame, or the gas is not heated to the temperature of 700° C. or higher. In order to achieve these, the length of the heating furnace 44 may be increased so that the residual gas is introduced to a low temperature portion separated away from the flame. However, in this manner, a new problem will be created in which the size of the device must be increased.

Also, when a relatively large amount of 1–10 vol. % of mercaptans is contained in the residual gas, mercaptans may be adsorbed by the reduction catalyst in the hydrogenation reactor 45, and this prevents sufficient desulfurization of the mercaptans. Hence, the recovery rate of the sulfur may not be increased in the overall process.

Accordingly, a first object of the present invention is to prevent the generation of soot in the heating furnace, which is a problem associated with the method for removing sulfur compounds disclosed in Japanese Unexamined Patent Application, First Publication No. Hei 10-28837, and to prevent increase in size of the heating furnace.

Also, a second object of the present invention is to carry out sufficient desulfurization even when the content of mercaptans in an impurity gas (acid gas) is high, and to improve the recovery rate of sulfur in the overall process.

DISCLOSURE OF THE INVENTION

In order to achieve the above object, in the present invention, only an off-gas emitted from a Claus reaction device is heated, and while the temperature of the off-gas after heating is controlled to be 700° C. or less, a residual gas is mixed with the off-gas so as to be transferred to a hydrogenation reactor in the next step.

Also, in order to achieve the second object, as a reduction catalyst filled in a hydrogenation reactor, a catalyst having a structure in which at least one of cobalt, nickel, and tungsten, in addition to molybdenum are supported by an alumina carrier, in particular, a structure in which molybdenum is concentratedly supported on the surface of catalyst particles, is used.

BEST MODE FOR CARRYING OUT THE INVENTION

Hereinafter, the present invention will be explained in detail with reference to the accompanying drawings.

Figure 2:
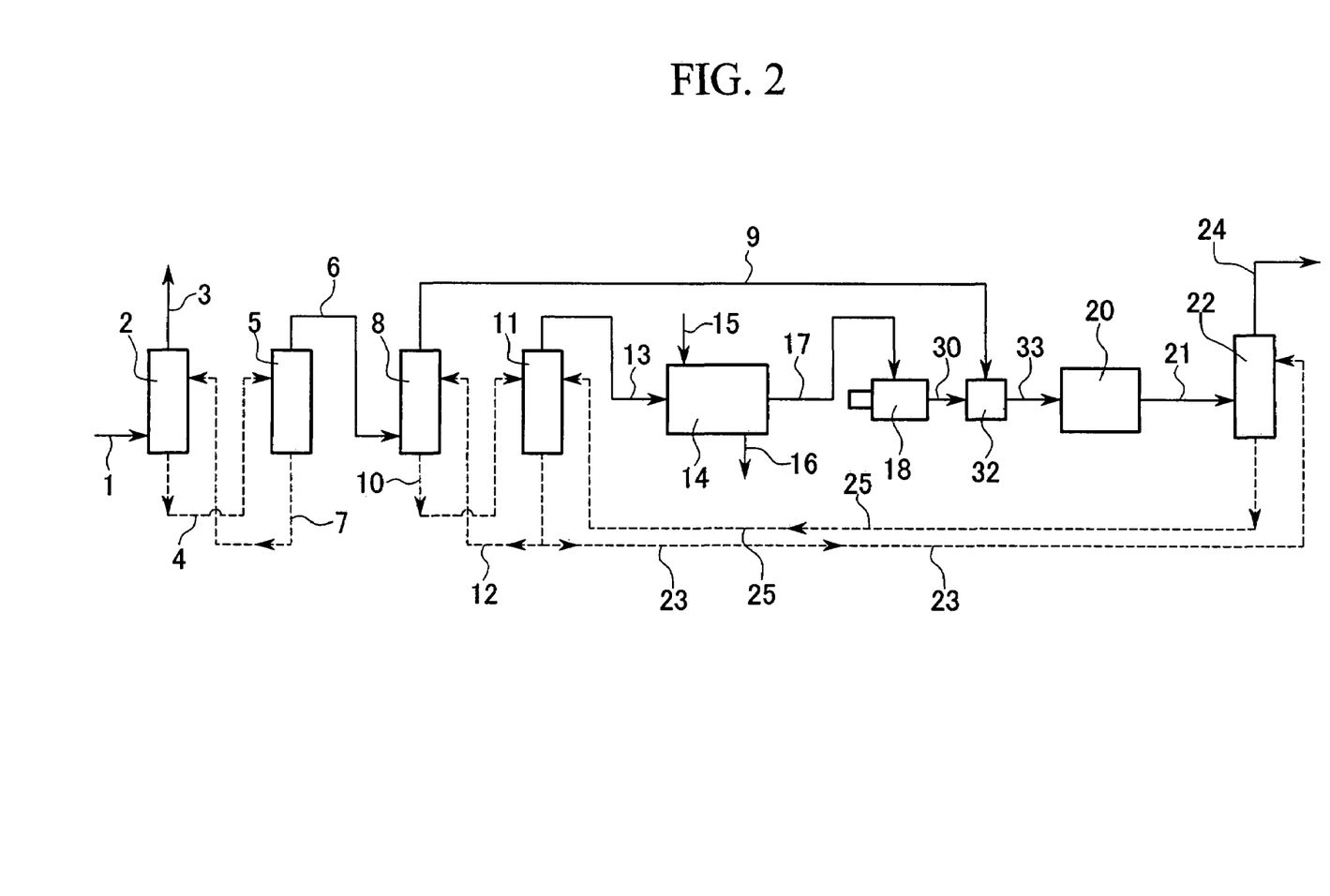
FIG. 2 is a diagram showing a schematic structure of a sulfur removing device according to the present invention.

FIG. 2 is a diagram showing an example of an apparatus for carrying out a method of removing sulfur compounds according to the present invention. In the apparatus, raw natural gas from gas wells is used as a natural gas, etc.

The raw natural gas is transferred, via a pipe 1, to a first absorption tower 2 where impurity gases accompanying the raw natural gas are non-selectively absorbed, and a purified product natural gas is introduced to a pipe 3 via the top of the tower. Aqueous solution of a sulfolane-amine mixed solution, monoethanol amine, diethanol amine, diglycol amine, methanol, or a glycol solution is supplied to the first absorption tower 2 as a non-selective absorption liquid so that a large amount of $CO_2$ and $H_2S$ accompanying the raw natural gas, a small amount of sulfur compounds, such as mercaptans, and a small amount of aromatic hydrocarbons, such as BTX, are absorbed.

The absorption liquid which absorbed the impurity gases, is transferred to a first regeneration tower 5 from the bottom of the tower 2 via a pipe 4, and is heated in the first regeneration tower 5 so that the impurity gases are discharged. The impurity gases (acid gases) contain, for example, about 70 vol. % of $CO_2$, about 25 vol. % of $H_2S$, and a small amount of mercaptans, and aromatic hydrocarbons, such as BTX.

The impurity gases are extracted by a pipe 6 via the top of the tower of the first regeneration tower 5, and the absorption liquid regenerated is returned to the first absorption tower 2 so as to be reutilized, from the bottom of the tower 5 via a pipe 7.

The impurity gases (acid gases) form the pipe 6 are introduced to a second absorption tower 8. A selective absorption liquid comprising an aqueous solution of alkanols, such as diethanol amine, triethanol amine, diisopropanol amine, and methyldiethanol amine, a sulfolane-amine mixed solution, polyethylene glycol dialkylether, or N,N-dimethylamino acetic acid salt is supplied to the second absorption tower 8 where a majority of $H_2S$ and a part of $CO_2$ contained in the impurity gas are absorbed. Although some of these absorption liquids may be used as a non-selective absorption liquid, it may be used as a selective absorption liquid which mainly absorbs $H_2S$ by selecting absorption conditions.

The absorption conditions are recognized as a temperature of 60° C. or less, preferably between 5 and 40° C., and a pressure of substantially atmospheric pressure or a slightly increased pressure of 2 atmospheres or less.

A residual gas comprising residual components, which was not absorbed in the second absorption tower 8, is introduced into a pipe 9 from the top of the tower 8. A majority of the residual gas consists of $CO_2$, and the rest of it includes 0.5–10 vol. % of mercaptans, 0.5–10 vol. % of BTX, and 0.03–0.3 vol. % of $H_2S$.

The absorption liquid drained from the bottom of the second absorption tower 8 is transferred to a second regeneration tower 11 via a pipe 10 where it is heated so that the absorbed $H_2S$ and $CO_2$ are discharged. In this manner, the amount of $H_2S$ becomes 50 vol. % or greater, for instance about 65 vol. % of $H_2S$ and about 35 vol. % of $CO_2$, and a concentrated gas in which $H_2S$ is concentrated is obtained from the top of the tower.

The regenerated absorption liquid is returned to the second absorption tower 8 from the bottom of the second regeneration tower 11 via a pipe 12, and is reutilized.

The second absorption tower 8 and the second regeneration tower 11 constitute a concentration-separation device of the present invention, and it is possible to increase the concentration of $H_2S$ by providing a plurality of each of these.

The concentrated gas from the second regeneration tower 11 is transferred, via a pipe 13, to a Claus sulfur recovery unit 14 including a Claus reaction furnace and a multi-layered Claus catalyst layer. The Claus sulfur recovery unit 14 has a known structure, and it includes a non-catalyst type and a catalyst type reactor. As a catalyst, alumina, bauxite, titanium, zirconium, silica, zeolite, or these containing oxide of a rare earth metal or an alkaline-earth metal as a thermal stabilizer, is used.

The reaction temperature is in the range of 1,000 to 1,500° C. for the non-catalyst type, and 200 to 350° C. for the catalyst type.

In the Claus sulfur recovery unit 14, a part of $H_2S$ in the concentrated gas is oxidized to be $SO_2$ by the action of an oxygen containing gas, such as oxygen gas and air, which is introduced via a pipe 15, and $SO_2$ is reacted with the residual $H_2S$ to form elementary sulfur. In this reaction, a majority of $H_2S$ is converted to elementary sulfur, and recovered from a pipe 16.

The exhaust gas (off-gas) from the Claus sulfur recovery unit 14 contains traces of $H_2S$, $SO_2$, S, COS, and $CS_2$, a large amount of $CO_2$, $H_2$, and residual oxygen, and $N_2$ if air is used as an oxygen source. The temperature of the off-gas is normally between 130 and 170° C.

The off-gas from the Claus sulfur recovery unit 14 is transferred to a heating furnace 18 via a pipe 17.

Figure 3:
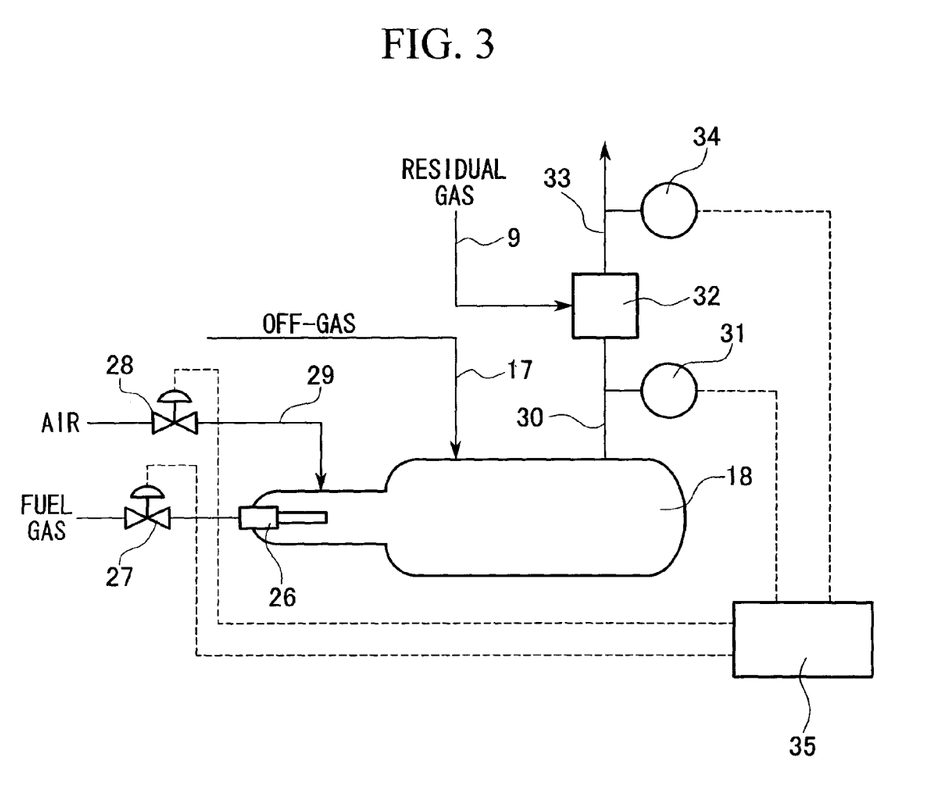
FIG. 3 is a diagram showing an example of a heating furnace used in the sulfur removing device according to the present invention.

FIG. 3 is a diagram showing an example of the heating furnace 18.

The heating furnace 18 is a transverse type furnace and is provided with a combustion burner 26. A fuel gas, such as methane and propane, is supplied to the combustion burner 26 via a fuel control valve 27. Also, an oxygen-containing gas, such as air, is supplied to the heating furnace 18 through a pipe 29 via an air control valve 28.

Moreover, the off-gas from the Claus sulfur recovery unit 14 is introduced via a pipe 17. Furthermore, an exhaust pipe 30 is provided from which heated off-gas is emitted, and a first temperature measuring device 31, such as a thermocouple, for measuring the temperature of the exhaust gas is attached to the exhaust pipe 30.

In addition, a gas mixing device 32, such as a gas mixing device disclosed in Japanese Examined Patent Application, Second Publication No. Sho 58-11247, is connected to the exhaust pipe 30 so that the residual gas from the pipe 9 is mixed with a heated off-gas.

The mixed gas from the gas mixing device 32 is transferred, via a pipe 33, to a desulfurization reactor 20 used in the next step, and a second temperature measuring device 34, such as a thermocouple, for measuring the temperature of the mixed gas is provided with the pipe 33.

Also, a controller 35 which controls the combustion of the heating furnace 18 is provided, and temperature data from the above-mentioned first and second temperature measuring devices 31 and 34 is input into the controller 35. In this manner, the controller 35 controls the fuel control valve 27 and the air control valve 28 so that the temperature of the heated off-gas measured by the first temperature measuring device 31 does not exceed 700° C., and the temperature of the mixed gas measured by the second temperature measuring device 34 is kept within the range of 230–300° C.

Also, at the same time, the controller 35 is preset to burn the fuel gas in the heating furnace under a partial oxidation condition in which no oxygen is present in the combustion gas so that CO and $H_2$ are produced.

The off-gas introduced into the heating furnace 18 is heated in the above-mentioned manner, and it is transferred together with the combustion gas at a temperature of 700° C. or less to the gas mixing device 32 where the gases are mixed with a residual gas. At that time, no soot is generated due to aromatic hydrocarbons, such as BTX, contained in the residual gas. The mixed gas is transferred to the desulfurization reactor 20 from the pipe 33 at a temperature of 230–300° C.

In the desulfurization reactor 20, sulfur compounds, such as $SO_2$, mercaptans, and S contained in the mixed gas are reduced and converted to $H_2S$ using $H_2$ contained and $H_2$ which is produced from a reaction of CO with water.

Examples of the reduction catalysts used include a catalyst in which at least one of cobalt, nickel, and tungsten, and molybdenum are supported by a carrier comprising γ-alumina or η-alumina. In particular, use of a catalyst including 8–15 wt. % of molybdenum, 2–5 wt. % of cobalt, and the remainder of γ-alumina or η-alumina, which has an egg-shell structure in which molybdenum is concentratedly supported on the surface of carrier particles, and cobalt is uniformly supported by the entire carrier particles, is preferable.

The desulfurization process of mercaptans in the desulfurization reactor 20 is carried out by the reaction with accompanying $H_2$ in accordance with the following reaction scheme (1), (2), and (3):

$$CH_3SH+H_2 \rightarrow CH_4+H_2S \quad (1)$$

$$C_2H_5SH+H_2 \rightarrow C_2H_6+H_2S \quad (2)$$

$$C_3H_7SH+H_2 \rightarrow C_3H_8+H_2S \quad (3)$$

Also, when the concentrations of CO and $H_2$ are low, the reaction may proceed in accordance with the following reaction scheme (4) and (5) in which desulfurization of mercaptans does not require $H_2$:

$$C_2H_5SH \rightarrow C_2H_4+H_2S \quad (4)$$

$$C_3H_7SH \rightarrow C_3H_6+H_2S \quad (5)$$

Moreover, when the above mentioned catalyst having the egg-shell structure is used as a reduction catalyst, the reaction expressed in the reaction scheme (4) and (5) is further enhanced, and the rate of desulfurization is improved.

For this reason, the stoichiometric ratio of CO and $H_2$ in the mixed gas introduced into the desulfurization reactor 20 is 0.5–5, preferably 0.8–4, and desulfurization of mercaptans may be carried out with a small amount of CO and $H_2$. In addition, desulfurization of mercaptan sufficiently proceeds even when the content of mercaptan becomes high.

The reaction condition in the desulfurization reactor 20 is said to be a temperature of 230–300° C., a pressure of atmospheric pressure to 2 bars, and a gas hourly space velocity of 500–3,000/hr.

In the present invention, heating of the off-gas transferred from the Claus sulfur recovery unit 14 may be performed by a means other than the heating furnace, for example, by a heat exchanger which burns a fuel gas and applies heat indirectly through a tube wall so that the temperature of the gas after heating becomes 700° C. or less. However, it is necessary to add $H_2$, or $H_2$ and CO, which are required in the next step, using the desulfurization reactor 20. Also, it is possible to dispose a heating means, such as a heat exchanger, at a middle of the pipe 13 to decrease the consumption of a fuel gas.

Hydrogenated gas from the desulfurization reactor 20 includes a few vol. % of $H_2S$, a small amount of aromatic hydrocarbons, such as BTX, a trace of unreacted mercaptans, $H_2$, and a large amount of $CO_2$ and $N_2$, and the gas is extracted from the pipe 21 to be transferred to a third absorption tower 22 after being cooled. A part of the absorbed liquid, which is regenerated in the second regeneration tower 11, is supplied, via a pipe 23, to the third absorption tower 22 as an absorption liquid.

In the third absorption tower 22, a part of $H_2S$ and $CO_2$ in the above-mentioned hydrogenated gas is absorbed, and the gas containing the remaining large amount of $CO_2$ and $N_2$, a small amount of aromatic hydrocarbons, such as BTX, mercaptans, $H_2$, and a trace of $H_2S$, is introduced into a pipe 24 from the top of the tower. Then, the gas is either emitted into the air or is combusted to be discharged to a stack.

The absorption liquid which has absorbed $H_2S$ and $CO_2$, is returned to the second regeneration tower 11 via a pipe 25 from the bottom of the third absorption tower 22. In the second regeneration tower 11, $H_2S$ and $CO_2$ are discharged as the above-mentioned concentrated gas, and this is transferred to the Claus sulfur recovery unit 14.

According to the method for removing sulfur compounds mentioned above, since the $H_2S$ concentration in the concentrated gas introduced into the Claus sulfur recovery unit becomes higher than that in the impurity gas, and the concentration of accompanying $CO_2$ decreases, the Claus reaction rate becomes high as well as the recovery rate of sulfur.

Also, since most of the sulfur compounds other than $H_2S$ contained in the impurity gas, such as mercaptans and COS, are eventually converted to $H_2S$, and are removed by the Claus reaction, the total sulfur content in an exhaust gas emitted in the air becomes extremely low. Moreover, since no heavy hydrocarbons, such as BTX, contained in the impurity gas is introduced into the Claus sulfur recovery device, no soot is generated in the Claus sulfur recovery unit. Accordingly, it becomes possible to prevent a lowering in the quality of recovered elementary sulfur and a generation of clogging in a catalyst layer.

Furthermore, since the residual gas from the second absorption tower 8 is mixed with an off-gas, which is heated to be 700° C. or less, no soot is generated due to aromatic hydrocarbons, such as BTX, contained in the residual gas. Accordingly, there is no danger that soot flows into the desulfurization reactor 20 and clogs or deactivates the catalyst layer.

In addition, if the above-mentioned catalyst is used as a reduction catalyst for a desulfurization reaction, mercaptans in the residual gas may be converted to $H_2S$ at a high conversion rate even when the concentration of mercaptans becomes high. Accordingly, the amount of CO or $H_2$ required for the conversion may be reduced.

Also, in a device in which CO and $H_2$ are generated by a partial oxidation of a fuel gas in the heating furnace 18, since the heating of the off-gas and the addition of CO and $H_2$ for desulfurizaion are carried out at the same time, it is efficient and economical.

Also, in the present invention, although an aqueous solution used in the second absorption tower 8 and the second regeneration tower 11 may be selected as an absorption liquid used in the third absorption tower 22, it is necessary, if the absorption liquid is different from the absorption liquid used in the second absorption tower 8, to separately provide a third regeneration tower so that it is separated from the concentration and separation process.

Moreover, in the present invention, it is possible to separate $H_2S$ by adsorption from the hydrogenated gas supplied from the desulfurization reactor 20 so that $H_2S$ may be returned to the Claus sulfur recovery unit 14. That is, an adsorption tower may be provided instead of the third absorption tower 22, in which adsorbent, such as activated carbon or activated carbon immersed with an aqueous solution of compounds that may be reacted with hydrogen sulfide, alumina, iron oxide, and zinc oxide, is filled so that $H_2S$ is adsorbed and separated.

Furthermore, when the off-gas from the Claus sulfur recovery unit 14 includes $CS_2$ and COS, it is possible to make the off-gas contact a hydrolysis catalyst after or at the same time as the desulfurization process so that sulfur compounds are converted to $H_2S$. Then, these may be separated in the third absorption tower 22, and be returned to the Claus sulfur recovery unit 14.

As explained above, according to the present invention, there is no danger that the catalyst layer in the desulfurization reactor will be clogged or deactivated by soot as in the method described in Japanese Unexamined Patent Application, First Publication No. Hei 10-28837. Also, if a catalyst in which at least one of cobalt, nickel, and tungsten, and molybdenum are supported by a carrier comprising γ-alumina or η-alumina, in particular, if a catalyst including 8–15 wt. % of molybdenum, 2–5 wt. % of cobalt, and the remainder of γ-alumina, which has an egg-shell structure in which molybdenum is concentratedly supported on the surface of carrier particles, and cobalt is uniformly supported on the entire carrier particles, is used as a desulfurization catalyst, mercaptans in the residual gas (impurity gas) may be converted to $H_2S$ at a high conversion rate even when the concentration of mercaptans becomes high, and the amount of CO and $H_2$ required for the conversion may be reduced.

Hereinafter, embodiments of the present invention will be explained.

(Experiment 1)

This experiment reveals the reasons that the heating temperature of the off-gas in the heating device should be 700° C. or less.

A gas burner was attached to an end of a quartz tube having an inner diameter of 30 mm and a length of 800 mm so that the nozzle of the burner was inserted into the quartz tube.

Branch tubes were attached to the quartz tube along the length direction of the tube with 100 mm intervals so that gas may be introduced through each of the branch tubes, and a thermocouple was attached to a base portion of each of the branch tubes so that the temperature of the base portion of each branch tube may be measured.

The gas burner was turned on, and the temperature of the base portion of each branch tube was measured. Also, a test gas comprising 88 vol. % of $CO_2$, 2 vol. % of ethylmercaptan, and 10 vol. % of benzene, which corresponds to a residual gas, was introduced into each of the branch tubes to observe the generation of soot when the gas was heated in the quartz tube.

As a result, the generation of soot was observed when the test gas was introduced into the branch tube at a position of 720° C. whereas no generation of soot was observed when the test gas was introduced into the branch tube at a position of 690° C.

From these experimental results, it was found that no soot is generated if the temperature of an off-gas is 700° C. or less, and a residual gas is mixed with the off-gas.

(Experiment 2)

This experiment was conducted to confirm the effect of a reduction catalyst used in a desulfurization reaction.

Preparation of Catalyst A:

The catalyst A is a catalyst in which molybdenum is concentratedly supported on the surface of γ-alumina carrier particles, and cobalt is uniformly supported on the entire γ-alumina carrier particles. The catalyst A may be obtained in accordance with a method disclosed in, for example, Japanese Unexamined Patent Application, First Publication No. Hei 4-317742.

That is, 35 g of ammonium molybdate tetrahydrate was dissolved in 1,000 cc of pure water, and concentrated nitric acid was added so that pH of the solution became 4 to yield an impregnation liquid.

The temperature of the impregnation liquid was maintained at 60° C., and 1,000 grams of γ-alumina having a diameter of 2–4 mm was put into a basket made of stainless steel and immersed in the impregnation liquid for 45 minutes. Then, the basket was taken out of the liquid, dewatered, and centrifuged. After being dried for four hours at 120° C., it was calcinated for five hours in air at 500° C.

The calcinated product obtained was put in a 500 cc beaker, and a solution in which 15 grams of cobalt nitrate hexahydrate was dissolved in 65 cc of pure water was dropped onto the calcinated product using a burette while shaking the product.

Then, after drying the resultant product for four hours at 120° C., the product was calcinated for five hours in air at 500° C. to obtain a catalyst.

The catalyst obtained had a spherical shape with a diameter of 2–4 mm, and 11.8 wt. % of $MoO_3$, and 3.8 wt. % of CoO were contained in the γ-alumina. As a result of measurements of a metal components concentration distribution in the radial direction of the catalyst using an electron probe micro-analyzer (EPMA), it was confirmed that molybdenum was concentratedly supported on the outer circumferential portion which corresponds to ⅔ of the radius, and that cobalt was uniformly supported on the entire catalyst. This was used as a catalyst A.

Preparation of Catalyst B:

Cobalt nitrate hexahydrate (15 g) was dissolved in 120 cc of pure water, and 25 cc of 28% ammonia water was added while stirring to obtain a cobalt ammonium complex salt solution. On the other hand, 18 grams of ammonium molybdate tetrahydrate was dissolved in 30 cc of 50° C. warm water by adding a small amount of ammonia water, and this was added to the above-mentioned cobalt ammonium complex salt solution to obtain an impregnation liquid.

The same γ-alumina (1,000 grams) having a diameter of 2–4 mm used in the preparation of catalyst A was put into a basket made of stainless steel and immersed in the above-mentioned impregnation liquid for 30 minutes. Then, the basket was taken out of the liquid, dewatered, and centrifuged. After being dried for four hours at 120° C., it was calcinated for five hours in air at 500° C. to obtain a catalyst.

The obtained catalyst contained 12.1 wt. % of $MoO_3$, and 4.0 wt. % of CoO in the γ-alumina. Also, as a result of measurements of a metal components concentration distribution in the radius direction of the catalyst using an EPMA, it was confirmed that molybdenum and cobalt were uniformly supported on the entire catalyst.

This catalyst was the same catalyst which was used in the method disclosed in Japanese Unexamined Patent Application, First Publication No. Hei 10-28837. This catalyst was used as a catalyst B.

Desulfurization Reaction Experiment 1

These catalysts were filled in a reactor made of stainless steel having an inner diameter of 48.6 mm and a length of 850 mm. After carrying out a preliminary sulfurization process for 12 hours at 300° C. under normal pressure using a gas containing 90 mol % of nitrogen, 9.7 mol % of hydrogen, and 0.3 mol % of hydrogen sulfide, desulfurization of mercaptans was performed by introducing a source gas 1 or a source gas 2, each of which had a composition shown in the following table I. The conversion of mercaptans was determined by measuring the concentration of hydrogen sulfide in an off-gas.

TABLE 1

|  | Source gas 1 | Source gas 2 | Source gas 3 |
| --- | --- | --- | --- |
| $CO_2$ | 65.2 | 52.0 | 52.0 |
| $H_2$ | 1.0 | 0.8 | 0.8 |
| CO | 1.0 | 0.6 | 0.6 |
| $N_2$ | 15.5 | 28.0 | 26.5 |
| Toluene | 5.1 | 0.5 | 0.5 |
| $H_2O$ | 10.2 | 17.0 | 17.0 |
| Methylmercaptan | 0.3 | 0.05 | 0.3 |
| Ethylmercaptan | 1.5 | 0.4 | 1.5 |
| Propylmercaptan | 0.2 | 0.05 | 0.2 |
| $H_2S$ | — | 0.5 | 0.5 |
| $SO_2$ | — | 0.1 | 0.1 |
| stoichiometric ratio | 1.0 | 2.8 | 0.7 |

Stoichiometric ratio = ($H_2$ conc. + CO conc.)/(mercaptan conc.)

Figure 4:
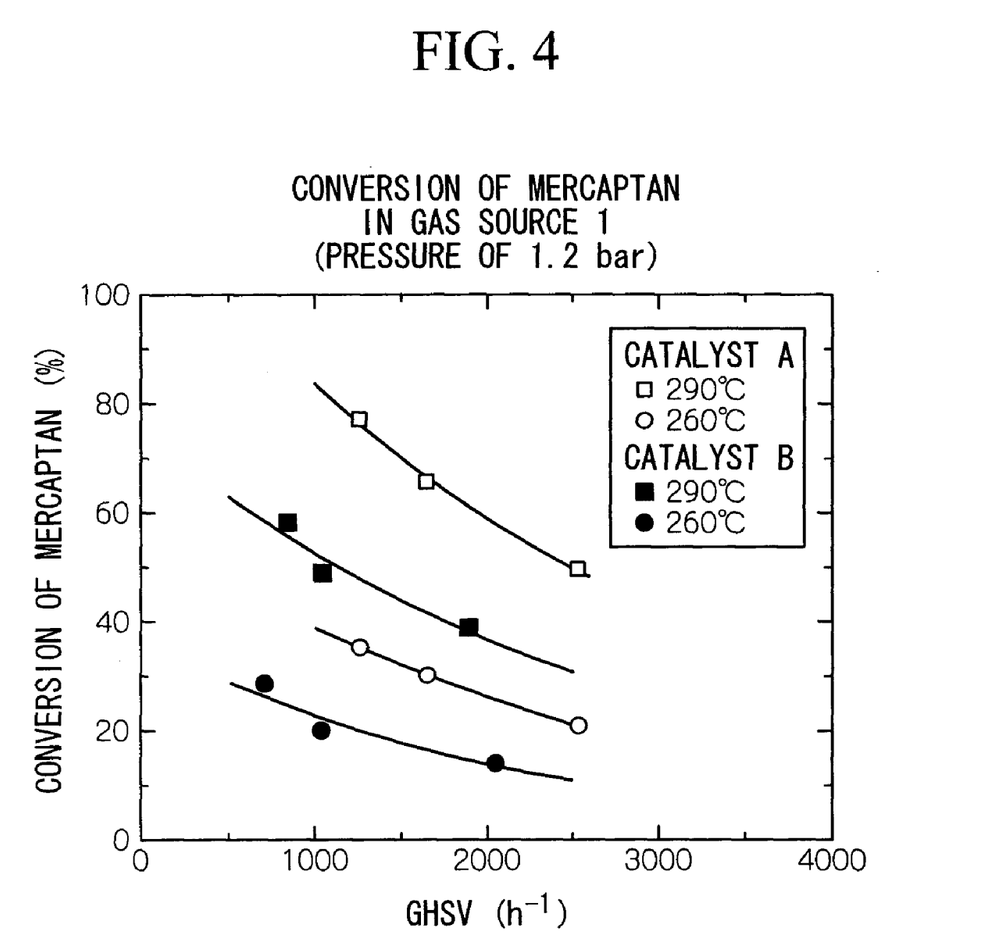
FIG. 4 is a graph showing results of an embodiment of the present invention.

FIG. 4 shows effects of reaction temperature and gas hourly space velocity on the mercaptan conversion when the catalysts A and B are used and the source gas 1 is introduced.

Figure 5:
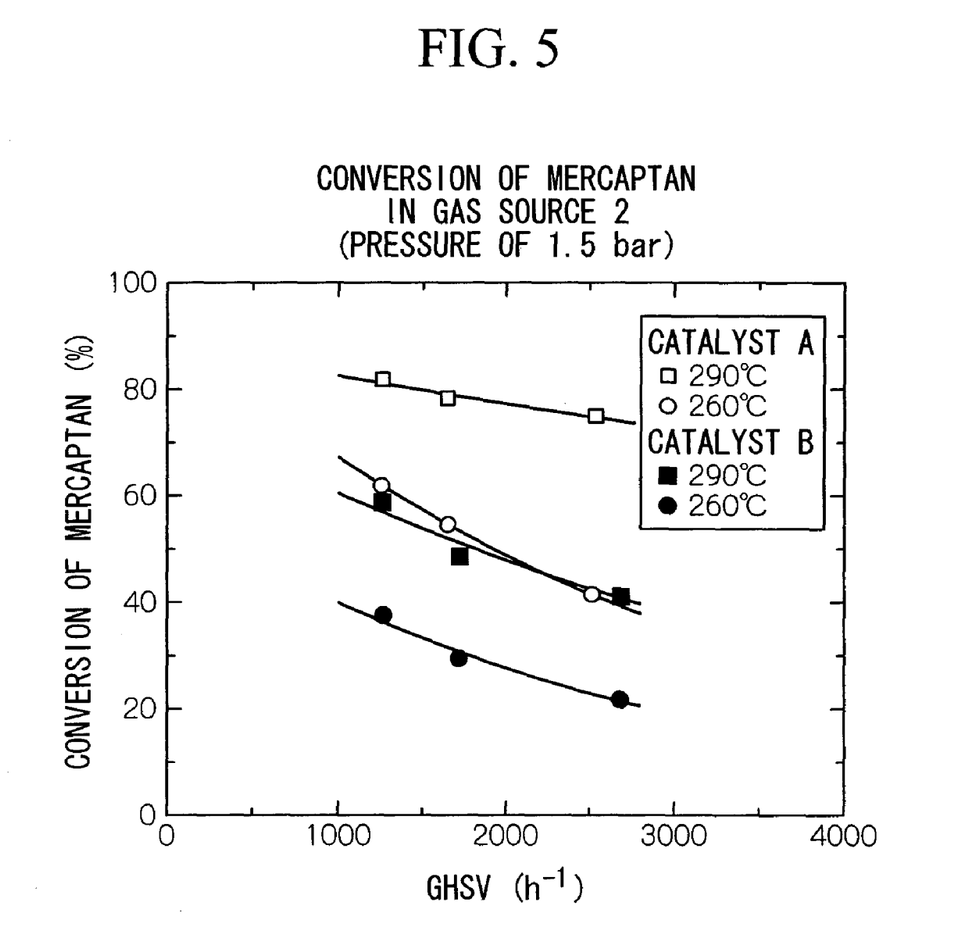
FIG. 5 is a graph showing results of another embodiment of the present invention.

FIG. 5 shows effects of reaction temperature and gas hourly space velocity on the mercaptan conversion when the catalysts A and B are used and the source gas 2 is introduced.

From the results shown in FIGS. 4 and 5, it is understood that the mercaptan conversion increases when the catalyst A is used.

Desulfurization Reaction Experiment 2

After the same preliminary sulfurization process was carried out using the same reactor as in the Reaction Experiment 1, conversion of mercaptans to hydrogen sulfide was performed using the source gas 3 shown in Table I at a reaction temperature of 290° C., a reaction pressure of 1.3 bar, and a gas hourly space velocity of 1000 $h^{-1}$.

The conversion when the catalyst A was used was 79%, and the molar ratio of ethylene to ethane contained in the off-gas was 5.5.

On the other hand, the conversion when the catalyst B was used was 42%, and the molar ratio of ethylene to ethane contained in the off-gas was 2.1.

From this result, it is obvious that the catalyst A has a better performance than that of the catalyst B even when the stoichiometric ratio is less than one.

INDUSTRIAL APPLICABILITY

The method and apparatus for removing sulfur compounds according to the present invention may be used for efficiently removing sulfur compounds, such as $H_2S$ and mercaptans, contained in an impurity gas which is, for example, associated with a natural gas obtained from a natural gas well, and recovering elementary sulfur as a simple substance.

We claim:

1. A method for removing sulfur compounds from an impurity gas containing sulfur compounds including hydrogen sulfide and mercaptans, carbon dioxide and aromatic hydrocarbons, comprising the steps of:

transferring the impurity gas to a concentration process in which the impurity gas is separated into a concentrated gas containing hydrogen sulfide as a main substance, and a residual gas containing carbon dioxide as a main substance, mercaptans and aromatic hydrocarbons;

transferring the concentrated gas to a Claus reaction process in which hydrogen sulfide is recovered as an elementary sulfur, and an off-gas discharged from the Claus reaction process is heated to be a temperature between at least equal to the temperature at which the off-gas is discharged from the Claus reaction process and 700° C. using a heating unit;

introducing the heated off-gas into a mixing unit which is provided separately from the heating unit, to be mixed with the residual gas;

transferring the resultant mixed gas to a hydrogenation reaction process in which sulfur compounds including mercaptans, are converted into hydrogen sulfide under the presence of a reduction catalyst; and separating the converted hydrogen sulfide and returning the separated hydrogen sulfide to the Claus reaction process.

2. The method for removing sulfur compound according to claim 1, characterized in that the off-gas is heated in a heating furnace provided with a combustion burner in order to perform a partial oxidation reaction of the fuel so that hydrogen and carbon monoxide are generated.

3. The method for removing sulfur compounds according to claim 1, characterized in that the reduction catalyst used in the hydrogenation reaction process is a catalyst in which (i) at least one of cobalt, nickel, and tungsten, and (ii) molybdenum are supported by an alumina carrier.

4. The method for removing sulfur compounds according to claim 3, characterized in that the reduction catalyst has a structure in which (i) at least one of cobalt, nickel, and tungsten, and (ii) molybdenum, are supported by an alumina carrier, and the molybdenum is concentratedly supported on a surface of catalyst particles.

5. An apparatus which removes sulfur compounds from an impurity gas containing sulfur compounds including hydrogen sulfide and mercaptans, carbon dioxide and aromatic hydrocarbons, comprising:
   a concentration and separation unit which separates the impurity gas into a concentrated gas containing hydrogen sulfide as a main substance, and a residual gas containing carbon dioxide as a main substance, mercaptans and aromatic hydrocarbons:
   a Claus reaction unit which recovers hydrogen sulfide contained in the concentrated gas transferred from the concentration and separation unit as an elementary sulfur using a Claus reaction;
   a heating unit which heats an off-gas discharged from the Claus reaction unit to a temperature between at least equal to the temperature at which the off-gas is discharged from the Claus reaction unit and 700° C.:
   a mixing unit which is provided separately from the heating unit and mixes the heated off-gas from the heating unit with the residual gas;
   a hydrogenation reactor which includes a reduction catalyst that converts sulfur compounds in the resultant mixed gas from the mixing unit into hydrogen sulfide; and
   a separation unit which separates hydrogen sulfide in the hydrogenated gas from the hydrogenation reactor and returns the separated hydrogen sulfide to the Claus reaction unit.

6. The apparatus for removing sulfur compounds according to claim 5, characterized in that the heating unit is provided with a combustion burner, and a control unit which controls a the temperature of the heated off-gas discharged from the heating unit to be between at least equal to the temperature at which the off-gas is discharged from the Claus reaction unit and 700° C., and performs a partial oxidation reaction of the fuel.

7. The apparatus for removing sulfur compounds according to claim 5, characterized in that the reduction catalyst used in the hydrogenation reaction unit is a catalyst in which (i) at least one of cobalt, nickel, and tungsten, and (ii) molybdenum, are supported by an alumina carrier.

8. The apparatus for removing sulfur compounds according to claim 7, characterized in that the reduction catalyst has a structure in in which (i) at least one of cobalt, nickel, and tungsten, and (ii) molybdenum, are supported by an alumina carrier, and the molybdenum is concentratedly supported on a surface of catalyst particles.

* * * * *

UNITED STATES PATENT AND TRADEMARK OFFICE
CERTIFICATE OF CORRECTION

PATENT NO. : 6,962,680 B1
DATED : November 8, 2005
INVENTOR(S) : Shinya Ishigaki et al.

It is certified that error appears in the above-identified patent and that said Letters Patent is hereby corrected as shown below:

Title page,
Item [54], Title, should read -- METHOD AND APPARATUS FOR REMOVING SULFUR COMPOUNDS FROM GAS CONTAINING HYDROGEN SULFIDE, MERCAPTANS, CARBON DIOXIDE, AND AROMATIC HYDROCARBON --.

Signed and Sealed this

Thirty-first Day of January, 2006

JON W. DUDAS
*Director of the United States Patent and Trademark Office*